United States Patent [19]

Jodehl

[11] 4,253,958

[45] Mar. 3, 1981

[54] METHOD OF TREATING POLLUTED AQUEOUS MEDIA

[76] Inventor: Poul A. Jodehl, Idrottsgatan 10, S-260 22 Tågarp, Sweden

[21] Appl. No.: 70,773

[22] Filed: Aug. 30, 1979

[30] Foreign Application Priority Data

Sep. 7, 1978 [SE] Sweden ................................ 7809415

[51] Int. Cl.³ .............................................. C02F 1/54
[52] U.S. Cl. ..................................... 210/728; 210/730
[58] Field of Search ................ 106/123 R; 210/42 R, 210/47, 49, 51–54; 252/180, 181; 260/124 R

[56] References Cited

U.S. PATENT DOCUMENTS

| 2,993,006 | 7/1961 | Allen et al. | 210/52 |
|---|---|---|---|
| 3,082,173 | 3/1963 | Horvitz | 210/52 |
| 3,314,880 | 4/1967 | Rubin | 210/52 |
| 3,622,510 | 11/1971 | Felicetta et al. | 210/54 |
| 3,697,498 | 10/1972 | Browning et al. | 260/124 R |

FOREIGN PATENT DOCUMENTS

| 91149 | 7/1975 | Japan | 210/53 |
|---|---|---|---|
| 148287 | 11/1975 | Japan | 210/53 |
| 1092565 | 8/1976 | Japan | 210/52 |
| 395471 | 8/1977 | Sweden . | |

*Primary Examiner*—Peter A. Hruskoci
*Attorney, Agent, or Firm*—Ladas & Parry

[57] ABSTRACT

The disclosure relates to a method of purifying aqueous media, in which the aqueous medium is treated under agitation, preferably air agitation, with a product which is prepared from lignin sulphonate, at least one cerium salt and aluminium sulphate. Use of the disclosed product for purifying aqueous media also falls within the scope of the invention.

5 Claims, No Drawings

METHOD OF TREATING POLLUTED AQUEOUS MEDIA

The present invention relates to a method of treating polluted aqueous media, in particular domestic waste water, and municipal and industrial effluent. In the method according to the invention, a lignin sulphonate-containing product is used. The use of this product also falls within the spirit and scope of the present invention.

It is well known in this art that many different factors must be taken into account in the purification of domestic waste water, municipal effluent and industrial effluent, these factors rendering the installation and operation of sewage treatment plants extraordinarily complicated. For example, both the chemical and physical compositions of the water which is to be purified must be taken into account. Furthermore, it is necessary during the operation of the sewage treatment plant to check variations in the disclosed composition, as well as in the amount of water which is to be treated. In this context, particular emphasis should be placed on those problems which occur in conjunction with the use of, for example, cleaning agents and solvents which give rise to emulsions. The processes involved in separating, breaking down and eliminating these emulsions result in increased problems for the sewage treatment plants. An increased use of phosphates and metal ions further exacerbates waste disposal problems. A further essential and well-documented disadvantage inherent in sewage treatment plants which are currently in operation is that the water which leaves the treatment plant is unusable as drinking water.

The above-presented problems and disadvantages clearly show the need within the art for a method which makes for a simple, effective and high-grade purification of different types of polluted aqueous media.

It has now most surprisingly proved that if a polluted aqueous medium is mixed with a product of the type disclosed below, and is subjected to agitation, there will obtained a pure aqueous phase and a flocculated, water-insoluble sludge phase in which substantially all of the pollutant substances in the water are collected.

The product with which the aqueous medium is treated according to the present invention may be prepared in that a lignin sulphonate is dissolved in water and mixed with a predetermined amount of a cerium salt. The thus obtained aqueous product of lignin sulphonate and the above-mentioned salt is mixed with aluminium sulphate. A product produced in a similar manner is described in Swedish patent specification No. 7416261-1. This patent specification describes the accelerating effect of the lignin sulphonate product in the biological degradation of hydrocarbons. At the time of inception of the invention described in the above-disclosed patent specification, there were no signs which indicated that the lignin sulphonate preparation could make a contribution in the purification of different types of pulluted aqueous media. Neither was there the slightest hint that the prepation would prove to have superior purification effects.

The contents of the different components included in the above disclosed product vary, naturally, in dependence upon the type of medium which is to be treated. Consequently, the optimum composition may be established by testing in each particular case.

According to the present invention, use may advantageously be made of a product which is prepared in the following manner:

100 g of calcium lignin sulphonate with a standardized iron content of from 0.05 to 0.15% is dissolved in 1 liter of water and mixed, preferably at elevated temperature such as from 50° to 100° C., preferably from 60° to 90° C., to a predetermined amount of cerium salt, such as from 0.5 to 10 g, preferably from 1 to 8 g of ceric sulphate. An amount of from 0.1 to 1.0, preferably from 0.3 to 0.7 cm$^3$ of this solution is withdrawn and mixed with a suitable amount, such as from 5 to 15, preferably from 8 to 12 cm$^3$ of a 10 to 30%, preferably 20% aluminium sulphate solution at a temperature ranging from room temperature to approximately 50° C., preferably from 25° to 45° C.

According to the present invention, the lignin sulphonate is added in the form of a slurry in water at any optional stage in the purification process. Hence, the actual method of operation according to the invention is very simple. The dosage of the above-described preparation varies in dependence upon the type of water which is to be treated and the concentration of the included pollutants. On this point it might be mentioned that the lignin sulphonate preparation may suitably be conveyed to the site of use in pulverulent form in order, thereafter, to be mixed with water so as to realize a slurry of suitable concentration. The operative solution which is to be added to the waste water may suitably have a product to water concentration ratio of 0.8–1.2:5, preferably 1:5.

In order that the treatment according to the invention give the desired result, the aqueous medium which has been admixed with the lignin sulphonate product is subjected to agitation. On this point, both mechanical agitation and air agitation may come into question. At the present time, air agitation is to be preferred because of its clearly improved purification effect.

The method according to the present invention is clearly superior to conventional methods for the purification of different types of waste water, since a purified water will be obtained which, in many cases, may directly be used as drinking water.

As regards the presence of heavy metals, it should be emphasized that, in conjunction with the flocculation according to the present invention, insoluble complexes of the heavy metals will be obtained and these substances may be easily be removed.

Another advantage inherent in the present invention is that, in those methods which are based on purification by activated slurry, the formed slurry amounts may be restricted in that the slurry is broken down because of the accelerating effect on the oxidation process which is realized by utilization of the above-defined lignin sulphonate-containing product.

The invention will be further illustrated by means of the following Examples:

100 g of a calcium lignin sulphonate with a standardized iron content of 0.1% was dissolved in 1 liter of water. The solution, heated to 75° C., was mixed with 4.4 g of ceric sulphate under continuous agitation. The thus obtained solution was used as a starting material for the continuation of the experiment.

An amount of 0.5 cm$^3$ of the above-disclosed solution was mixed with 10 cm$^3$ of an absorptively active 20% aluminium sulphate solution at a maximum temperature of 35° C. The thus obtained product was used in laboratory and field experiments.

This product was preferably used for purifying effluent water in sewage treatment plants, the best results being obtained in preliminary experiments (laboratory experiments) in the use of 0.005 vol%, which corresponds to a cerium oxide content of 0.000005 g of cerium oxide/100 cm$^3$ effluent and, thus, a concentration of from $10^{-6}$ to $10^{-7}$.

The following table shows the results which were obtained in analysis of the water which had been purified according to the present invention. In this case the untreated water consisted of municipal effluent.

TABLE

| 1 | 2 | 3 | 4 |
|---|---|---|---|
| pH 8.15 | 8.1 | 8.1 | 8.0 |
| A 0.0025 | 0.005 | 0.01 | 0.03 |
| PO$_4$: 0.22 | 0.18 | 0.6 | 0.5 |
| BSB$_5$: 65 | 14 | 85 | 120 |
| Metal ions: Traces of less | — | Traces of less | Traces of lead |

| | |
|---|---|
| pectin, tanning substances and lignin: | 240 mg/l |
| Spec. conductivity: | 9.900 μS/cm |

Analysis of sample precipitated with a working solution (granulate: H$_2$O = 1:5) of a compound according to the invention
(test carried out on filtered aqueous phase)

| | |
|---|---|
| pH: | 7.1 |
| Colour: | Pale yellow |
| Smell: | Resin like (terpene derivatives) |
| Iron: | 1.5 mg/l |
| Permanganate consumption: | 47.51 mg/l |
| Phenolic acid: | Non-existant |
| Hemicellulose, pectin, tanning substances and lignin converted by precipitation to phlobaphenes and lignin: | >1/mg/l |

Analysis of leachate from rubbish tip (Analysis III)
Examination results:

| Sample |  | 1 | 2 |
|---|---|---|---|
| Lead, Pb | mg/l | <0.10 | <0.10 |
| Cadmium, Cd | " | <0.02 | <0.02 |
| Cobalt, Co | " | <0.05 | <0.05 |
| Copper, Cu | " | 0.06 | 0.05 |
| Chromium, Cr | " | <0.05 | <0.05 |
| Nickel, Ni | " | 0.25 | 0.12 |
| Zinc, Zn | " | 0.84 | 0.20 |
| Mercury, Hg | μg/l | <0.10 | <0.10 |
| Arsenic, As |  |  |  |
| Beryllium, Be |  |  |  |

The precipitation agent is a 0.4% solution of a compound according to the invention.

1 Leachate rubbish tip prior to precipitation
2 Leachate rubbish tip after precipitation with a compound according to the invention.

Analysis of leachate (Analysis IV)

|  |  | untreated sample | sample treated with a compound according to the invention |
|---|---|---|---|
| pH |  | 6.9 | 6.4 |
| Fe | mg/l | 28 | 0.42 |
| Mn | " | 1.2 | 1.2 |
| Zn | " | 0.06 | 0.03 |
| Pb | " | <0.1 | <0.1 |
| Cd | " | <0.02 | <0.02 |
| Cu | " | <0.04 | <0.04 |
| COD | " | 180 | 140 |
| $BOD_7$ | " | 61 | 45 |
| $SO_4$ | " | 14 | 11 |
| Cl | " | 114 | 115 |
| F | " | ~0.1 | ~0.1 |
| $NH_4$-N | " | 50 | 52 |
| Kj-N | " | 74 | 70 |

Note:
The samples were too small for determining other nutrient salts.

What I claim and desire to secure by letters patent is:

1. In a method of purifying polluted aqueous media selected from the group consisting of domestic waste water, and municipal and industrial effluent by flocculation, the steps comprising:

(a) mixing the aqueous media with an effective amount of a product prepared by dissolving calcium lignin sulphonate with an standardized iron content of from 0.05 to 0.15% based on the weight of said sulphonate in 1 liter of water per 100 g of said sulphonate and mixing with from 0.5 to 10 g of ceric sulphate, a solution being formed, of which from 0.1 to 1.0 cm³ per liter of said solution is withdrawn and mixed with from 5 to 15 cm³ per liter of said solution of a 10 to 30% aluminium sulphate solution at a temperature ranging from room temperature to approximately 50° C. to form said product;

(b) subjecting the aqueous media containing the product produced according to (a) to agitation for flocculation of substantially all of the pollutants present in the aqueous medium to obtain a pure aqueous phase and a water insoluble flocculated sludge phase; and (c) separating the water-insoluble flocculated phase from said pure aqueous phase.

2. The method as recited in claim 1, wherein the disclosed lignin sulphonate product is added in the form of a slurry in water.

3. The method as recited in claim 1, wherein said agitation comprises air agitation.

4. The method as recited in claim 1, wherein the amount of ceric sulphate is of the order of from 1 to 8 g.

5. The method as recited in claim 1, wherein the lignin sulphonate-containing product is prepared in the following manner:
100 g of calcium lignin sulphonate with a standardized iron content of from 0.05 to 0.15% is dissolved in 1 liter of water and mixed with from 1 to 8 g of ceric sulphate, a solution being formed, of which from 0.3 to 0.7 cm³ is withdrawn and mixed with from 8 to 12 cm³ of a 20% aluminium sulphate solution at a temperature of between 25° and 45° C.

* * * * *